United States Patent [19]
Bednar et al.

[11] Patent Number: 5,832,460
[45] Date of Patent: Nov. 3, 1998

[54] METHOD AND SYSTEM FOR BILL PRESENTATION AND PAYMENT RECONCILIATION

[75] Inventors: Gregory M. Bednar, Matthews; Thomas E. Carr, Charlotte; James W. Donahue, Charlotte; Robert F. Hendrix, Jr., Charlotte; Richard J. Kuklentz, Charlotte; William A. Uhrich, Charlotte, all of N.C.

[73] Assignee: International Business Machines Corporation, Armonk, N.Y.

[21] Appl. No.: 458,931

[22] Filed: Jun. 2, 1995

[51] Int. Cl.[6] .................................................. G06F 17/60
[52] U.S. Cl. .............................. 705/27; 705/40; 735/379; 380/24
[58] Field of Search ................ 364/401 R, 402, 364/406, 408; 235/379, 380, 381; 705/40, 42, 44, 39, 45, 27; 395/226, 227, 239, 240, 242, 244; 380/24, 30

[56] References Cited

U.S. PATENT DOCUMENTS

| | | | |
|---|---|---|---|
| 4,759,063 | 7/1988 | Chaum | 380/30 |
| 4,759,064 | 7/1988 | Chaum | 380/30 |
| 4,914,698 | 4/1990 | Chaum | 380/30 |
| 4,926,480 | 5/1990 | Chaum | 380/23 |
| 4,947,430 | 8/1990 | Chaum | 380/25 |
| 4,949,380 | 8/1990 | Chaum | 380/30 |
| 4,987,593 | 1/1991 | Chaum | 380/3 |
| 4,991,210 | 2/1991 | Chaum | 380/30 |
| 4,996,711 | 2/1991 | Chaum | 380/23 |
| 5,131,039 | 7/1992 | Chaum | 380/23 |
| 5,220,501 | 6/1993 | Lawlor et al. | 364/408 |
| 5,276,736 | 1/1994 | Chaum | 380/24 |
| 5,326,959 | 7/1994 | Perazza | 235/379 |
| 5,367,624 | 11/1994 | Cooper | 364/401 |
| 5,373,558 | 12/1994 | Chaum | 380/23 |
| 5,383,113 | 1/1995 | Kight et al. | 364/401 |
| 5,424,938 | 6/1995 | Wagner et al. | 364/408 |
| 5,465,206 | 11/1995 | Hilt et al. | 705/40 |
| 5,483,445 | 1/1996 | Pickering | 364/406 |
| 5,504,677 | 4/1996 | Pollin | 364/408 |
| 5,649,117 | 7/1997 | Landry | 395/240 |
| 5,677,955 | 10/1997 | Doggett et al. | 380/24 |
| 5,699,528 | 12/1997 | Hogan | 395/240 |
| 5,727,249 | 3/1998 | Pollin | 705/40 |

OTHER PUBLICATIONS

Ross, Richard C. and Bort, Richard, "Models for Consumer Billing and Payment Systems", draft dated May 30, 1995, all pages.

Interactive Transaction Partners, "Interactive Branchless Banking, Personal Banking at Its Best", ITP Branchless Banking Brochure, p. 4.

*Primary Examiner*—Paul Loomis
*Assistant Examiner*—Binh K. Tieu
*Attorney, Agent, or Firm*—Kenneth A. Seaman

[57] ABSTRACT

A system and method for electronically creating, presenting, paying and reconciling bills includes an electronic bill presenter in electronic communication with bill originators, bill payers and respective banks. The electronic bill presenter receives bill data from bill originators, creates bills in a graphical format for electronic presentation to bill payers, and transmits bill payment instructions received from bill payers to bill payers' banks for transfer of payments to bill originators' banks. The electronic bill presenter also sends a confirmatory reconciliation message to the bill originator for payment instructions received from bill payers.

22 Claims, 7 Drawing Sheets

FIG. 6

IBM BILL PAY

File  Edit  Options  Setup  Windows  Help

PAY  NEXT  BANK  PAYEE  SUMMARY  HISTORY  REPORTS  MAIL  BILLS  NOTE  SEND

UNOPENED BILLS

OPENED BILLS

PRUDENTIAL INS.
M.S. WATER CO.
DINER'S CLUB
NB VISA
JOHN HANCOCK
C. OBSERVER

Summary of Outstanding Bills

| Rcv Date | Payee | Amt. Due | Amt. Paid | Due Date | Status |
|---|---|---|---|---|---|
| 20 Dec. 1994 | Prudential Insurance Co. | $ 447.63 | $ 447.63 | 10 Jan. 1995 | Send Pending |
| 23 Dec. 1994 | Mid South Water | 25.90 | 25.90 | 11 Jan. 1994 | Send Pending |
| 23 Dec. 1994 | Diner's Club | 133.00 | 133.00 | 14 Jan. 1994 | Send Pending |
| 23 Dec. 1994 | NationsBank Visa | 2,635.00 | 2,635.00 | 05 Jan. 1995 | Send Pending |
| 23 Dec. 1994 | John Hancock Life | 434.14 | 434.14 | 09 Jan. 1995 | Send Pending |
| 20 Dec. 1994 | Charlotte Observer | 32.50 | 32.50 | 15 Jan. 1995 | Send Pending |
| 3 Jan. 1995 | Duke Power Co. | 51.55 | 51.55 | 9 Jan. 1995 | Send Pending |
| 3 Jan. 1995 | VisionCable | 24.44 | 24.44 | 10 Jan. 1995 | Send Pending |
| 3 Jan. 1995 | Southern Bell | 28.81 | 28.81 | 19 Feb. 1995 | Send Pending |
| 3 Jan. 1995 | Piedmont Natural Gas | 153.94 | 153.94 | 30 Jan. 1995 | Send Pending |

Close — 602

← 601

METHOD AND SYSTEM FOR BILL PRESENTATION AND PAYMENT RECONCILIATION

BACKGROUND OF THE INVENTION

1. Field of the Invention

The present invention relates to a method and system for electronic presentation and payment of bills. More particularly, the present invention includes a service which sorts bills (by customer) from a plurality of bill providers and presents to a customer those bills addressed to that customer, then receives and processes payment instructions for payment of the bills and which reconciles payments to their respective bills.

2. Prior Art

Electronic payment systems for bills received in the mail are known. These systems frequently create a consolidated check with a list of payments provided to the bill originator. Such systems lose the details of the remittance document which is mailed as part of the bill, and requires keying of an account number multiple times, each of which is costly in time and presents the opportunity for error.

Another payment system in use for commercial accounts is known as financial electronic data interchange, or FEDI. An FEDI system typically involves an automatic system for paying bills between a single merchant and a single customer. FEDI requires complex data processing software systems because the bills are paid automatically and only an exception ends up requiring human intervention. However, consumers and small businesses prefer to be involved in their financial transactions and be "masters of their destinies", involved in paying their bills. Therefore, an FEDI system would not be appropriate as a bill paying system for consumers and small businesses.

Accordingly, the prior art systems have significant limitations and disadvantages.

SUMMARY OF THE INVENTION

The present invention overcomes the limitations and disadvantages of the present art system by providing a bill presentation and payment reconciliation system especially suited for use by consumers and small business organizations. The present invention involves a payment service which receives a plurality of bills for multiple customers from a variety of bill originators, sorts the bills by customer, presents the bills addressed to a customer in response to their use of the payment system, receives customer's instructions regarding paying the bill, initiates an order to a customer's bank to pay the bill and provides a record of the payment to the bill originator.

This system is advantageous in that the customer, in addition to saving time and money, is aware of and can control the payment of his bills, allowing the customer to schedule payments and make partial payments if desired.

The present system allows the bill originator to receive reconciliation data which allows payment processing to occur on a non-exception basis. This has the advantageous effect of avoiding errors from correlation with the amount and data from the original bill.

The present invention has the further advantageous effect that the bill template may be stored and recalled as needed and need not be transmitted for access each bill, saving on communication cost. This allows customers to get bills in a format comparable to today's paper bills as the bill originator might send through the mail.

The foregoing and other further advantages and objects of the present invention will be apparent to those skilled in the art in view of the foregoing description of the preferred embodiment taken together with the appended claims and the accompanying drawings.

BRIEF DESCRIPTION OF THE DRAWINGS

FIG. 6 is a third screen as seen by a bill payer using the system of the present invention, showing a summary of the paid bills prior to sending.

DETAILED DESCRIPTION OF THE PREFERRED EMBODIMENT

Figure 1:
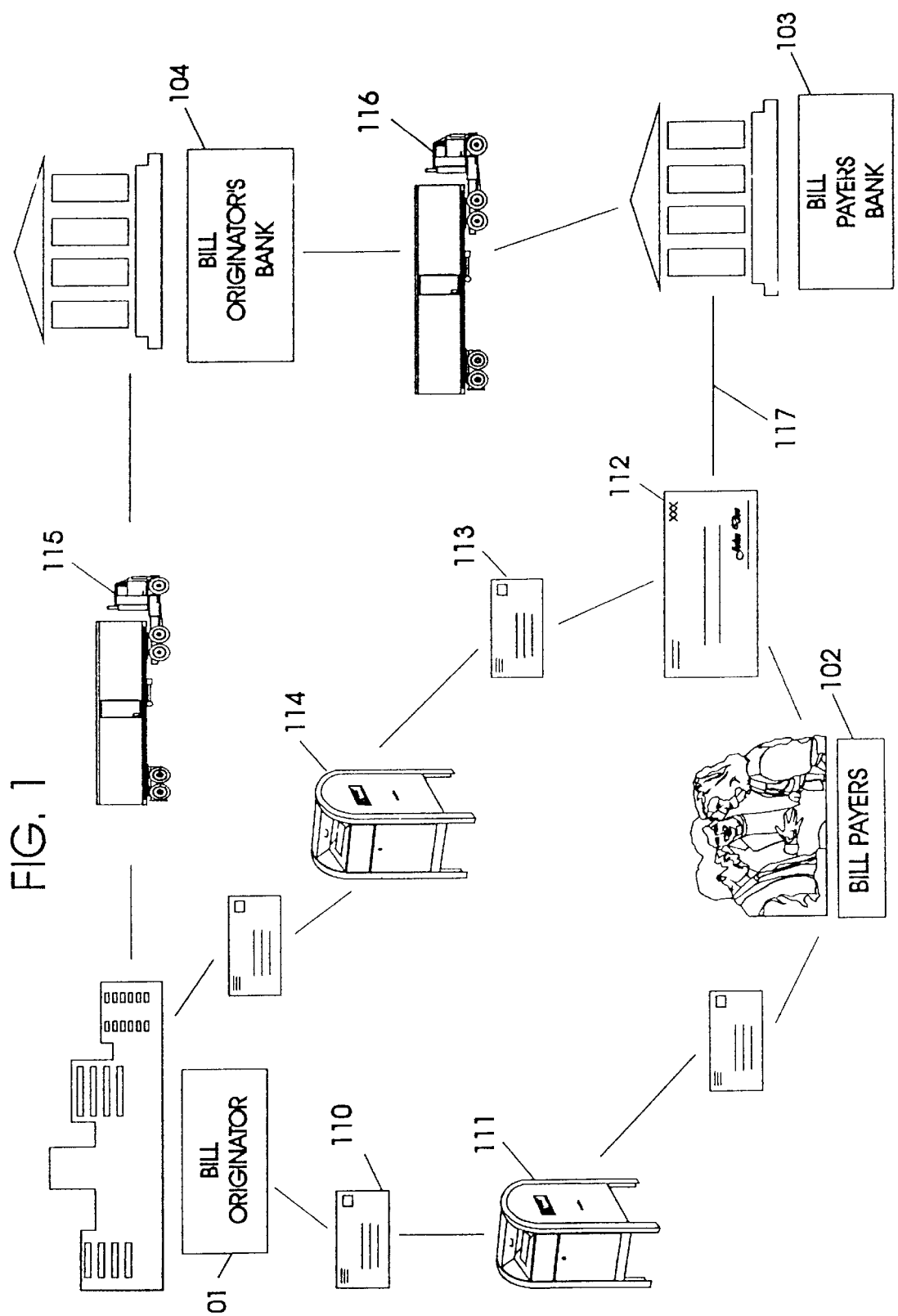
FIG. 1 is a schematic representing a bill payment system as currently implemented before the present invention.

FIG. 1 is a schematic representation showing a bill payment system as currently implemented prior to the present invention. This involves bill originator 101, bill payers 102 and their bank 103. The bank for the bill originator is shown by 104.

The bill originator 101 sends a bill as illustrated by the envelope 110 through the mail as illustrated by the mailbox 111 to the bill payer 102. The bill payer 102 issues a check 112, encloses it in an envelope 113 and sends it through the mail as illustrated by the mailbox 114 to the bill originator 101. The bill originator then uses a carrier 115 to transport the bill payer's check to the bill originator's bank 104. The bank 104 then uses a carrier 116 to transport the check to the bill payer's bank 103, then the bill payer's bank 103 returns the check as illustrated by line 117 to the bill payer, completing the cycle. The carriers and the mail are obvious sources of potential cost, delay and possibility of loss.

Figure 2:
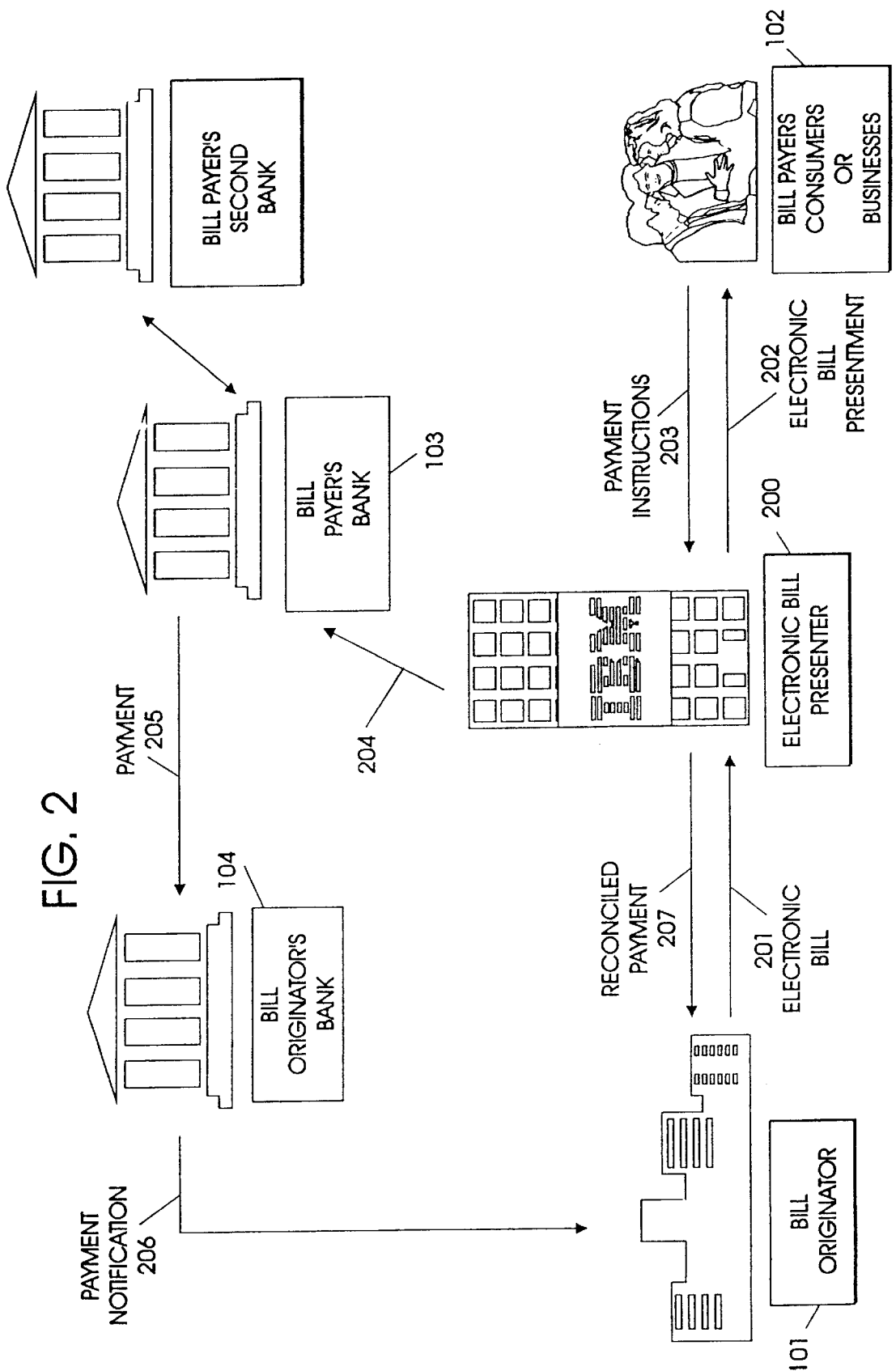
FIG. 2 is a schematic representation of the bill presentation and payment system of the present invention.

In FIG. 2, the bill originators 101, the bill payers or customers 102, the bill payer's bank 103 and the bill originator's bank 104 remain unchanged from the implementation in FIG. 1. The system of FIG. 2 has the addition of an electronic bill presenter 200 being interposed into the system and allowing the electronic presentation and payment as we described. A bill originator 101 creates the information necessary to bill customers and then sends an electronic message 201 to the electronic bill presenter 200. The electronic bill presenter 200 sorts the bills from various bill originators (the more the better) and presents the bills for a selected customer to the bill payer 102 in the form of electronic bill presentment method 202. The bill payer 102 then indicates the bills that he wishes to be paid, the amounts of the payments by a return message or payment authorization 203 to the electronic bill presenter 200. That payment authorization 203 is then sorted by bank, and a message is presented on line 204 to each of the banks involved as associated with individual customers or bill payers 102. The bill payer's bank 103 then sends a message to the bill originator's bank 104 as evidenced by the line 205 indicating a payment. The bill originator's bank sends a message or payment notification as indicated by 206 to the bill originator, with detail as to the amount and customers involved. Meanwhile, the electronic bill presenter 200 has sent a message 207 indicating the reconciled payments to the bill originator for comparison with the payment notification messages 206 received from the bill originator's bank 104.

Figure 3:
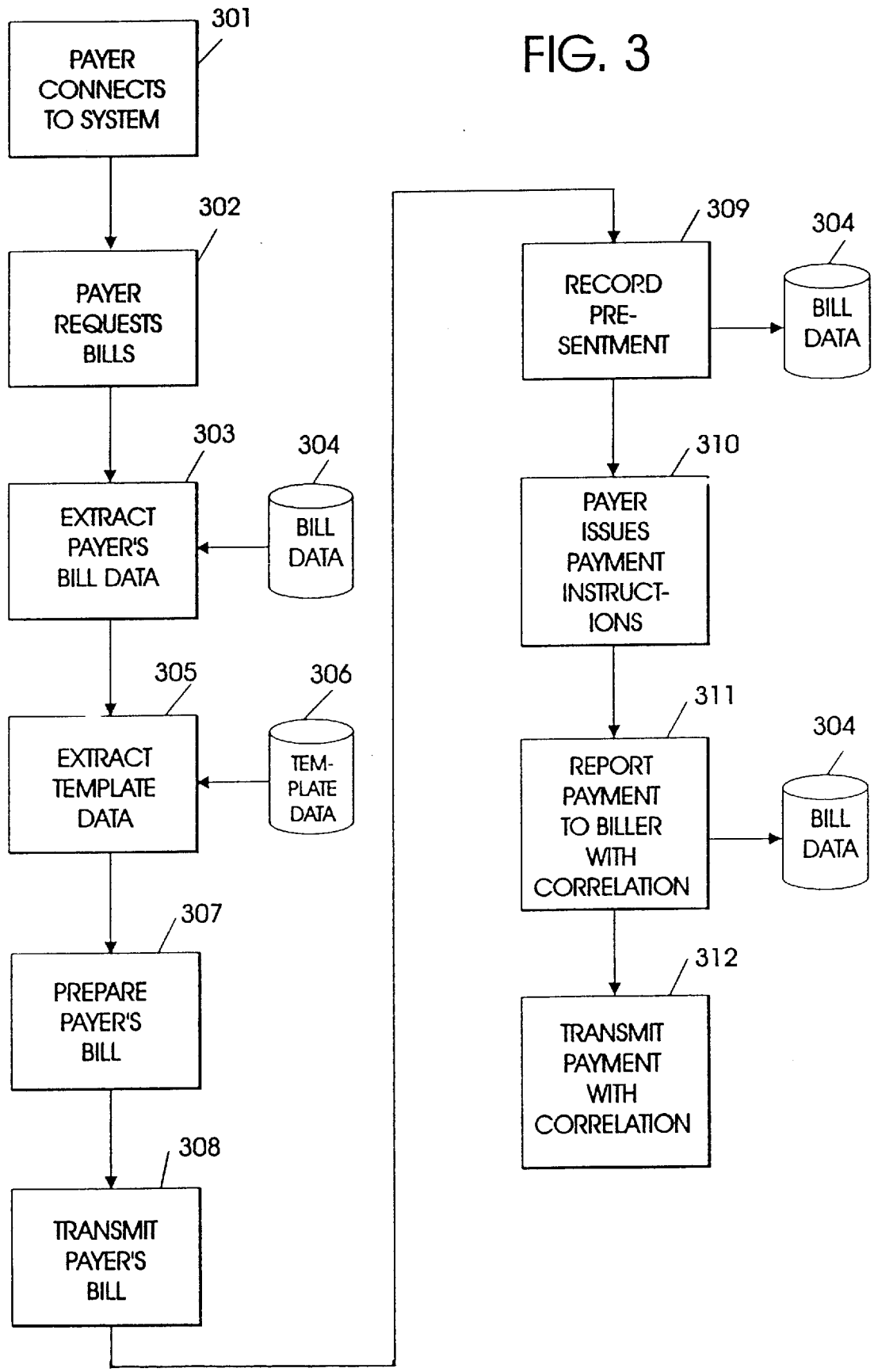
FIG. 3 is a flow chart of the electronic bill presentation and payment system of the present invention.

FIG. 3 is a flow chart of the process for paying bills. At block 301, the payer connects to the system and at block 302 the payer requests the bills. The system extracts the payer's bill data at block 303 from the bill database 304. At block 305, template data is extracted from template database 306. The bill data and the template data will be combined at block 307 to create the bill which is transmitted to the payer and displayed on his device.

Of course, there are many different devices that could be used to display the payments. A personal computer, a screen phone, interactive TV, telephone, personal digital assistance (PDA) an automatic teller machine (ATM), Internet terminal or other device could be used. Some of these terminals like a personal computer have local storage while other terminals like a telephone have no local storage. Where the terminal includes local storage, at the first instance of a bill from a particular bill originator, the system can send the template information to the bill originator for local storage (e.g., on the personal computer) for future instances of that bill. Where the user terminal includes no local storage, the total bill must be transmitted and presented on each occurrence. Thus, the template plus the variable bill data will be made for such user terminal for each bill.

At block 309, the bill presentment will be recorded in the bill database 304. When the bill payer issues payment instructions at block 310, his payment will be recorded at block 311 with information to the bill originator and an update to the bill database 304. At block 312, the payment and correlating information are transmitted to the payer's bank for processing.

Figure 4:
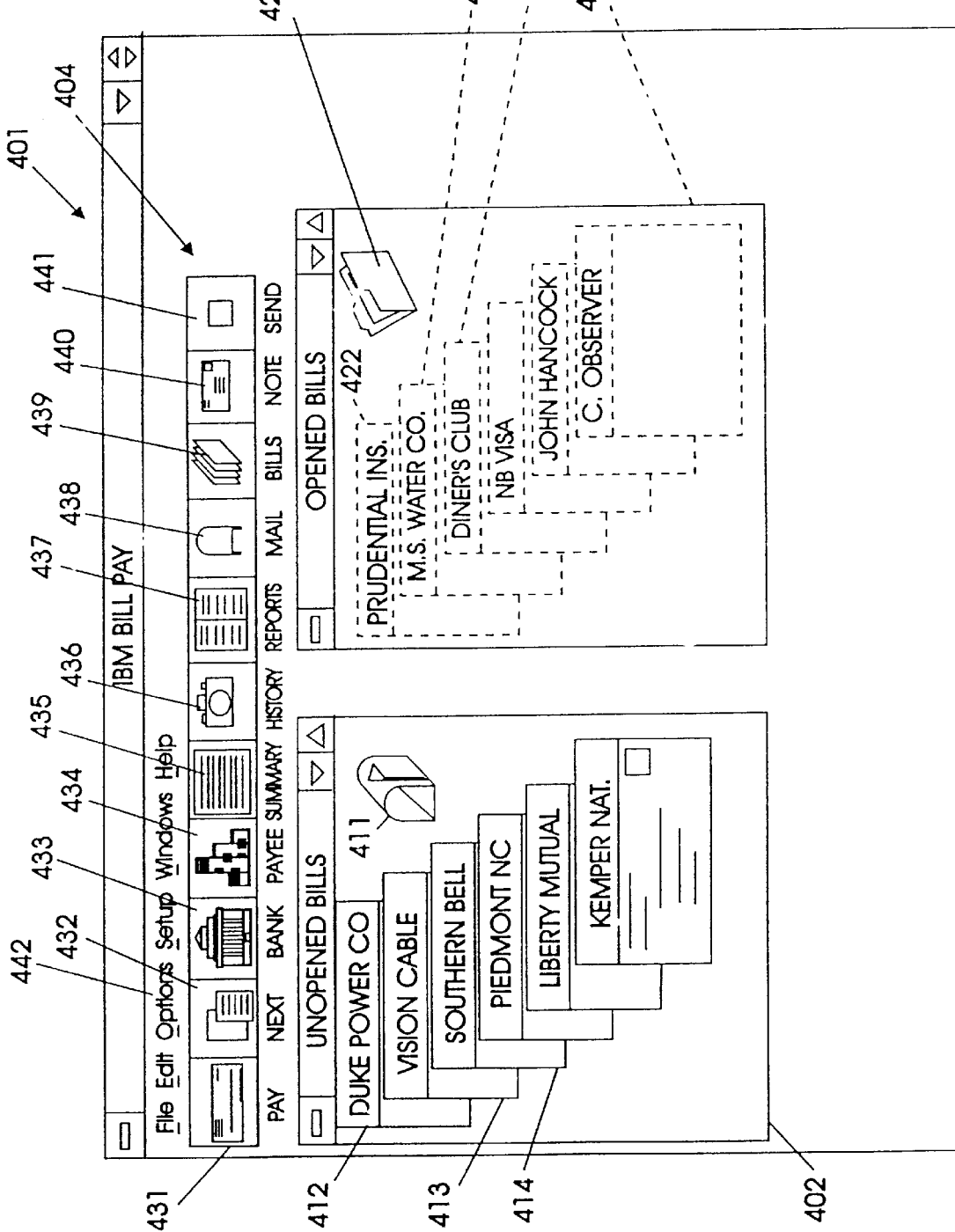
FIG. 4 is a first screen as seen by a bill payer using the electronic bill presentation and payment system, showing outstanding opened and unopened bills.

FIG. 4 illustrates an example of the screen 401 a customer or bill payer (102 in FIGS. 1 and 2) will see in paying his bills. The screen 401 is divided into a region 402 showing new or unopened bills, a region 403 showing old or previously opened bills, and a region 404 showing action icons. The region 402 includes a mailbox 411 and bill representations 412, 413, 414, . . . , each including a "from" line indicating the name of the bill originator (e.g. Duke Power for bill 412). The region 403 of opened bills includes a file folder icon 421 and bill representations 422, 423, 423 . . . The opened bills are those which had already been received and reviewed, but not yet acted upon (for example, a bill which was received but which is not yet due or as to which the customer has a reason for not paying). The region 404 with action icons is sometimes called a tool bar with buttons and includes an icon 431 to pay a bill, an icon 432 to move to the next bill, an icon 433 to identify bank account(s) used to pay bills, an icon 434 to process payee information (add, delete or modify) and an icon 435 to get a summary of outstanding bills. Icons 436, 437, 438, 439, 440 and 441 are for, respectively showing, history log of paid bills, providing bill and payment reports, opening mail box window, opening bill file window, attaching note to payment and sending payment. Selection Option 442 from the screen's action bar allows selecting predetermined options such as automatic open (automatically selecting and showing the next bill when the previous bill is paid), autopay (automatically show the payment check when a bill is selected) and lightning pay (automatically paying all outstanding bills without showing either the bill or the check). Bills can be color or otherwise coded, if desired, as by indicating bills designated to be paid in green, bills opened but not yet designated to be paid by yellow and bills not yet opened (newly arrived) by red. As is customary with a graphical user interface, each icon has a symbol relating to the function as well as a descriptive word and may be invoked by moving the computer cursor to the icon, then using the computer mouse to click on it to select it.

Figure 5:
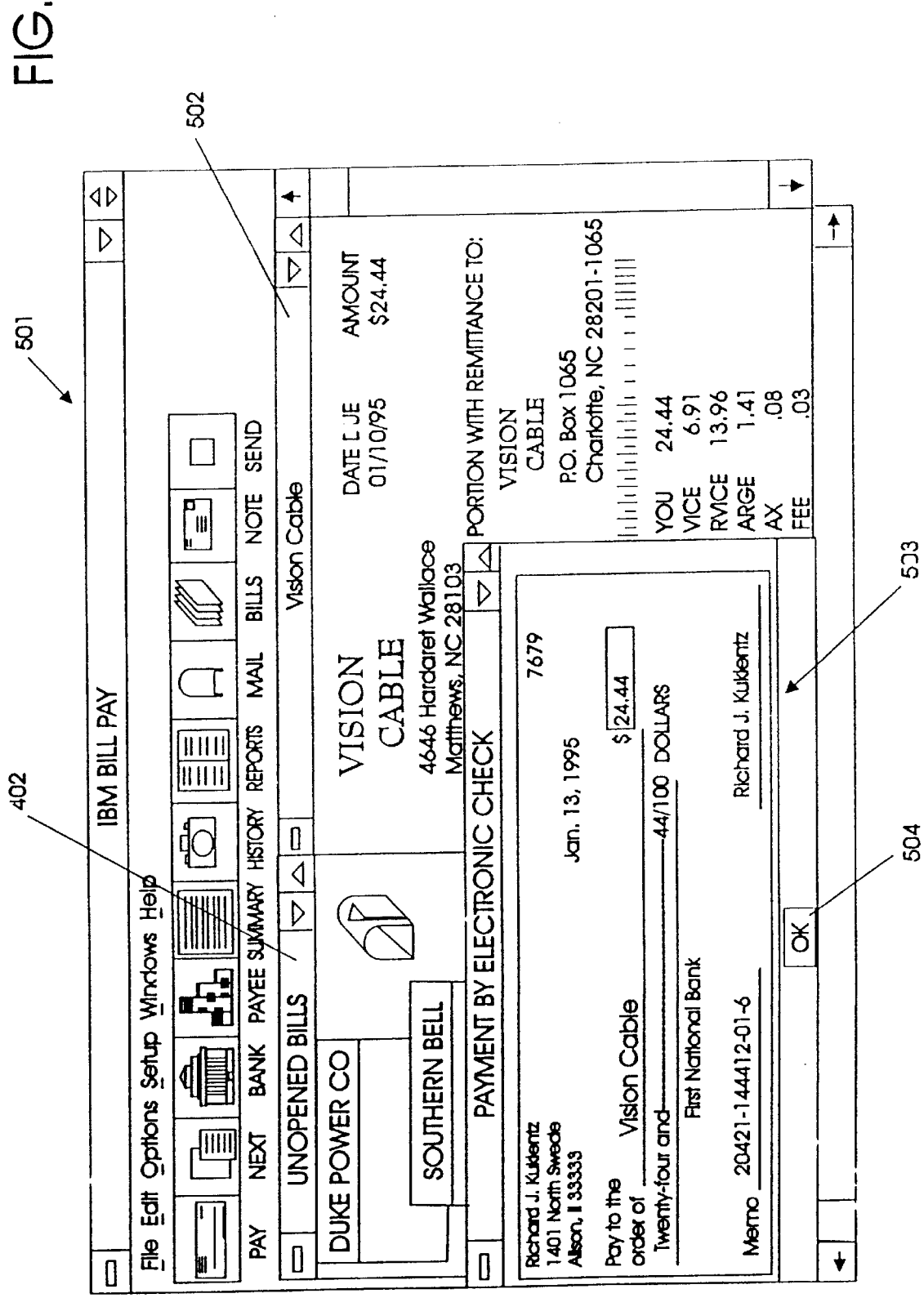
FIG. 5 is a second screen as seen by a bill payer, as the bill payer opens and then pays a bill.

FIG. 5 illustrates the screen 501 that a customer or bill payer uses to pay a bill. At the left, a portion of the unopened bill region 402 is shown, with the bill from Vision Cable selected and the bill shown in a right hand region 502. Once the customer selects to pay the bill, a check metaphor 503 appears on the display. If the customer agrees with the display shown (in this case to pay $24.44 to Vision Cable for Account 20421-144412-01-6 from his checking account at First National Bank), he clicks on an OK icon 504.

FIG. 6 illustrates the summary of the outstanding bills and payments to be made in a region 601. If the customer wishes to authorize all of the payments to be made, he indicates by clicking on the send icon 441 (in FIG. 4).

Figure 7:
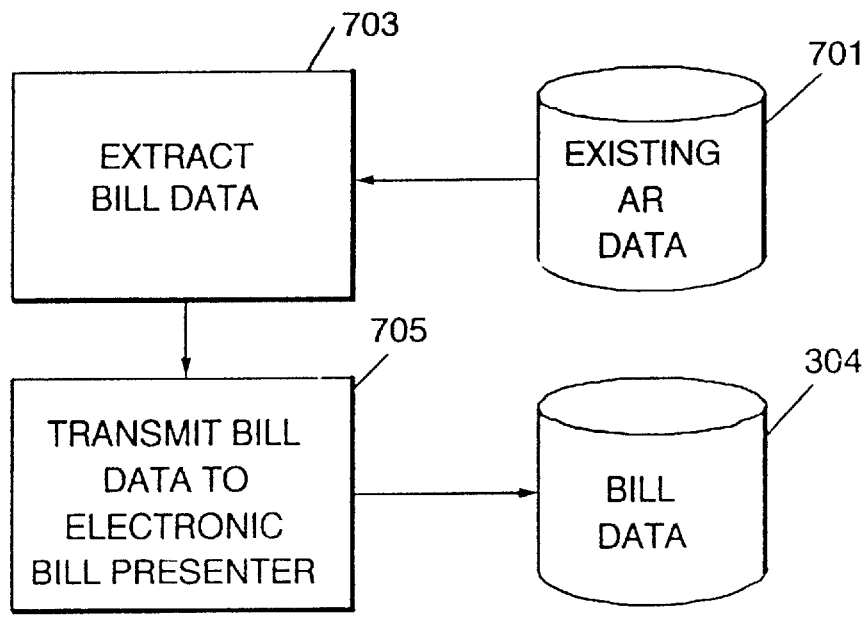
FIG. 7 is a flow chart showing the process by which a bill originator creates and transmits a bill.

FIG. 7 illustrates the flow chart of the process used by a bill originator to generate a bill. The bill data is extracted at block 703 from the bill originator's accounts receivable data base 701 and is transmitted at block 705 to the electronic bill presenter and is used to update the bill database 304 previously described.

Figure 8:
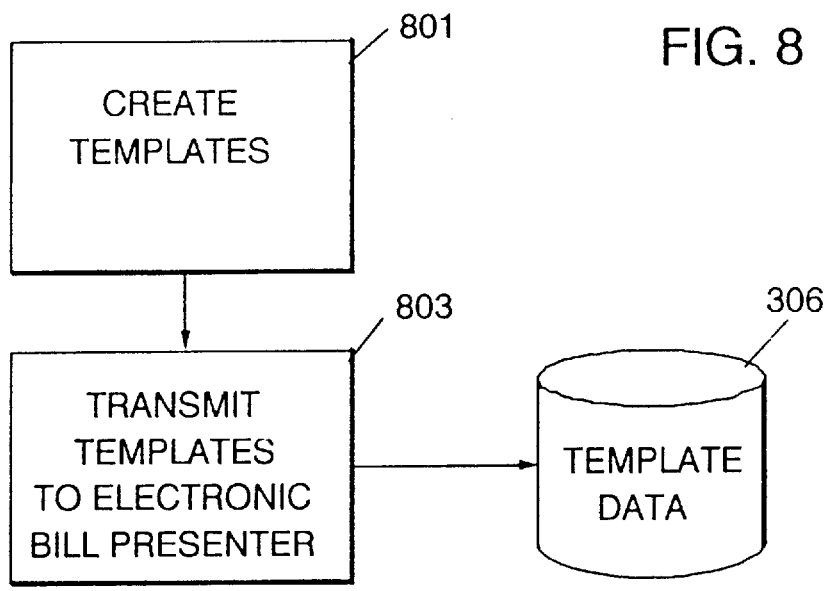
FIG. 8 is a flowchart showing the process for creating and storing a template.

FIG. 8 illustrates the process for creating and storing template for bills. At block 801, the bill originator creates his template(s) for his bills. These are transmitted to the electronic bill presenter at 803 and stored in the template database 306.

Of course, many modifications and adaptations to the preferred embodiment will be apparent to those skilled in the art. Further, those skilled in the art will appreciate that some aspects of the present invention will be used to advantage without the corresponding use of other aspects. For example, as discussed, the type of equipment being used by the customer is variable, and the type of bill presented may be varied by the equipment used by the customer. The arrangement of bills and the form of record may be changed as desired and further, might be integrated with existing financial software packages such as electronic checkbook, tax or accounting systems.

Accordingly, the foregoing description of the preferred embodiment should be considered as merely illustrative of the present invention and not in limitation thereof. The present invention is defined solely by the claims which follow:

Having thus described the invention, what is claimed is:

1. A method of electronically providing bill payment services for presenting bills to the customer for payment by a bank having customer's funds, the steps of the method comprising:

receiving a plurality of bills for multiple customers from at least one bill originator;

sorting the bills by customer;

presenting electronically bills addressed to a customer to that customer in response to the customer's use of the payment service;

receiving electronically a payment instruction from a customer who is paying a bill;

initiating an order to the customer's bank to pay the bill; and providing a record of the customer's payment of the bill.

2. A method of providing bill payment services including the steps of claim 1 wherein the step of presenting bills to the customer includes a computer program for assembling variable information of a bill with a general bill template.

3. A method of providing bill payment services including the steps of claim 2 wherein the step of assembling of the variable information includes retrieving template information which is stored locally within the customer's system.

4. A method of providing bill payment services including the steps of claim 1 wherein the step of presenting includes a graphical user interface showing the bills addressed to the customer.

5. A method of providing bill payment services including the steps of claim 1 wherein the step of providing a record of payment includes the step of providing the bill originator an electronic message including the details of the bill presented.

6. A method of electronic presentment and payment of bills originated by a bill originator and presented to bill payers, the method comprising the steps of:

creating bills in electronic form for transmission as electronic messages from a bill originator to an electronic bill presenter, transmitting bills in electronic form from a bill originator to an electronic bill presenter, sorting bills received by the electronic bill presenter according to bill payers identified in the electronic messages, presenting bills to bill payers connected to the electronic bill presenter in the form of electronic messages by transmitting electronic messages from the electronic bill presenter to identified bill payers, receiving payment instructions at the electronic bill presenter from bill payers instructing payment of electronic bills received from the electronic bill presenter, transmitting a payment order from the electronic bill presenter to a bill payer's bank, the payment order consistent with payment instructions received from a bill payer to transfer payment of an electronically presented bill from the bill payer's bank directly to a bill originator's bank, and notifying the bill originator by electronic message from the electronic bill presenter of transmission of a payment order from the electronic bill presenter to a bill payer's bank to transfer a payment directly to a bill originator's bank in payment of an electronically presented bill.

7. The method of claim 6 further comprising the step of transferring a payment from the bill payer's bank to the bill originator's bank in accordance with payment instructions received by the electronic bill presenter from a bill payer and transmitted from the electronic bill presenter to a bill payer's bank.

8. The method of claim 7 further comprising the step of sending a message from the bill originator's bank to the bill originator confirming receipt of a payment from a bill payer's bank as payment of an electronically presented bill.

9. The method of claim 6 wherein multiple bill originators are electronically connected to the electronic bill presenter for transmission of bills as electronic messages, and multiple hills from multiple bill originators are collectively presented by the electronic bill presenter to a bill payer.

10. The method of claim 6 further comprising the step of reconciling payment instructions processed by the electronic bill presenter with notification of payments received by a bill originator's bank.

11. The method of claim 6 further comprising the step of creating electronic bills by combining bill data received from a bill originator with a bill template adapted to contain and present data of bills to individual bill payers.

12. The method of claim 11 further comprising the step of combining data of multiple bills for an individual bill payer with a single bill template.

13. The method of claim 11 further comprising the step of generating graphical representations of bill data combined with a bill template for presentation to a bill payer.

14. The method of claim 11 further comprising the step of generating a bill payment data entry format in a graphical form of a check for presentation to a bill payer for entry and transmission of bill payment data.

15. The method of claim 11 further comprising the step of generating graphical control functions for display with said template and bill data whereby a bill payer controls electronic bill presentation, payment and records by selection of said graphics control functions.

16. The method of claim 11 further comprising the step of generating graphical representations of records of bills presented or paid via the electronic bill presenter.

17. The method of claim 12 wherein a bill originator performs the steps of creating a bill template adapted to contain and present electronic bills to bill payers, and transmits the bill template to the electronic bill payer for storage in a bill template database.

18. The method of claim 6 further comprising the step of initiating transmission of electronic messages from the electronic bill presenter to a bill payer upon receipt of a request from a bill payer via a connection with the electronic bill presenter for electronic presentation of a bill.

19. A system for electronic presentation, payment and reconciliation of bills, the system comprising:

an electronic bill presenter in electronic communication with at least one bill originator and a plurality of bill payers, the electronic bill, presenter operative to receive bill data from a bill originator in the form of an electronic message, the electronic bill presenter further operative to create electronic bills for graphical presentation to bill payers by combining bill data with a graphical bill template, the electronic bill presenter further operative to transmit to bill payers identified by said bill data graphical representations of electronic bills from bill originators, the electronic bill presenter further operative to receive bill payment instructions from a bill payer to authorize a bill payer's bank to transfer a payment to a bill originator's bank in payment of an electronic bill, the electronic bill presenter further operative to transmit a message to a bill originator notifying the bill originator of receipt of payment authorization from a bill payer to which a bill originator's bill was presented by the electronic bill presenter.

20. The system of claim 19 wherein said electronic bill presenter further comprises a data base for receiving and storing bill data from bill originators.

21. The system of claim 19 wherein said electronic bill presenter further comprises a template data base for receiving and storing bill templates combinable with bill data to create graphical presentations of bills.

22. The system of claim 19 wherein the electronic bill presenter further comprises a program for generating graphical representations of bill templates and combining bill data retrieved from a bill data base with a bill template to create a graphical representation of an electronic bill, and transmitting a graphical representation of an electronic bill to a display device of a bill payer.

* * * * *

UNITED STATES PATENT AND TRADEMARK OFFICE
CERTIFICATE OF CORRECTION

PATENT NO. : 5,832,460  
APPLICATION NO. : 08/458931  
DATED : November 3, 1998  
INVENTOR(S) : Gregory M. Bednar et al.

Page 1 of 1

It is certified that error appears in the above-identified patent and that said Letters Patent is hereby corrected as shown below:

Column 6 line 35, please delete the comma after "the electronic bill".

Signed and Sealed this

Thirty-first Day of March, 2009

JOHN DOLL  
*Acting Director of the United States Patent and Trademark Office*